(12) United States Patent
Jelinek et al.

(10) Patent No.: US 8,157,197 B2
(45) Date of Patent: *Apr. 17, 2012

(54) SYSTEM AND METHOD FOR PRODUCING A SPOOL OF TUBULAR FABRIC FOR USE IN MANUFACTURING PAINT ROLLER COVERS

(75) Inventors: Dale C. Jelinek, Janesville, WI (US); Marcus L. Skildum, Janesville, WI (US); Daniel L. Sinykin, Bayside, WI (US)

(73) Assignee: Siny Corp., Janesville, WI (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/268,548

(22) Filed: Nov. 11, 2008

(65) Prior Publication Data

US 2009/0088307 A1    Apr. 2, 2009

Related U.S. Application Data

(63) Continuation-in-part of application No. 11/871,307, filed on Oct. 12, 2007, now Pat. No. 7,503,190, and a continuation-in-part of application No. 11/203,833, filed on Aug. 15, 2005, which is a continuation-in-part of application No. 10/426,577, filed on Apr. 30, 2003, now Pat. No. 6,929,203, which is a continuation-in-part of application No. 10/283,853, filed on Oct. 30, 2002, now Pat. No. 6,685,121, which is a continuation of application No. 09/864,969, filed on May 24, 2001, now Pat. No. 6,502,779.

(51) Int. Cl.
*B65H 55/04*    (2006.01)
*B65H 18/08*    (2006.01)

(52) U.S. Cl. ........................... 242/178; 242/471

(58) Field of Classification Search ............... 242/160.1, 242/176, 178, 552, 556, 556.1, 413.4, 413.5, 242/471, 413.6, 551; 206/389, 417; 66/194
See application file for complete search history.

(56) References Cited

U.S. PATENT DOCUMENTS

| | | | |
|---|---|---|---|
| 2,298,682 A | 10/1942 | Dahlstrom | |
| 2,669,742 A | 2/1954 | Coughlan | |
| 2,984,425 A | 5/1961 | Thayer | |
| 3,322,363 A | 5/1967 | Davidson et al. | |
| 3,721,397 A | 3/1973 | Hori et al. | |
| 4,093,146 A | 6/1978 | Haley | |
| 4,155,158 A * | 5/1979 | Gurrera-Folch | 29/727 |
| 4,322,232 A * | 3/1982 | Beane | 55/360 |
| 4,401,504 A | 8/1983 | Kobayashi | |
| 4,482,100 A | 11/1984 | Yoshida | |
| 4,545,549 A | 10/1985 | Rundo | |
| 4,645,554 A | 2/1987 | Wyser | |

(Continued)

*Primary Examiner* — William E Dondero
(74) *Attorney, Agent, or Firm* — Reinhart Boerner Van Deuren s.c.

(57) ABSTRACT

A system and method for producing a spool having a length of tubular fabric wound thereupon is disclosed, the tubular fabric being substantially spirally wound upon a core with consecutive windings of the extended length tubular fabric being located close adjacent each other, and with consecutive rows of the extended length tubular fabric overlaying each other on the hollow core. The winding operation simultaneously controls both the lateral position at which the tubular fabric is wound onto the core and the rotation of the core to achieve the tight and highly compact winding operation, with the speed of the winding operation being controlled according to the amount of the tubular fabric which is available at any given time. The tubular fabric is suitable for use in the manufacture of paint roller covers.

13 Claims, 12 Drawing Sheets

U.S. PATENT DOCUMENTS

| | | |
|---|---|---|
| 4,676,448 A | 6/1987 | Kofler |
| 4,759,512 A | 7/1988 | Gaiser |
| 4,830,283 A * | 5/1989 | Johnson ................. 239/197 |
| 5,137,595 A * | 8/1992 | Garcia .................... 156/425 |
| 5,169,083 A | 12/1992 | Sannohe et al. |
| 5,487,805 A * | 1/1996 | Boriani et al. ........... 156/159 |
| 5,516,058 A | 5/1996 | Omokawa et al. |
| 5,614,047 A | 3/1997 | Garcia |
| RE35,526 E | 6/1997 | Garcia |
| 5,694,688 A | 12/1997 | Musch et al. |
| 5,809,804 A * | 9/1998 | Kuhrau et al. ............ 66/9 B |
| 6,007,016 A | 12/1999 | Helton |

* cited by examiner

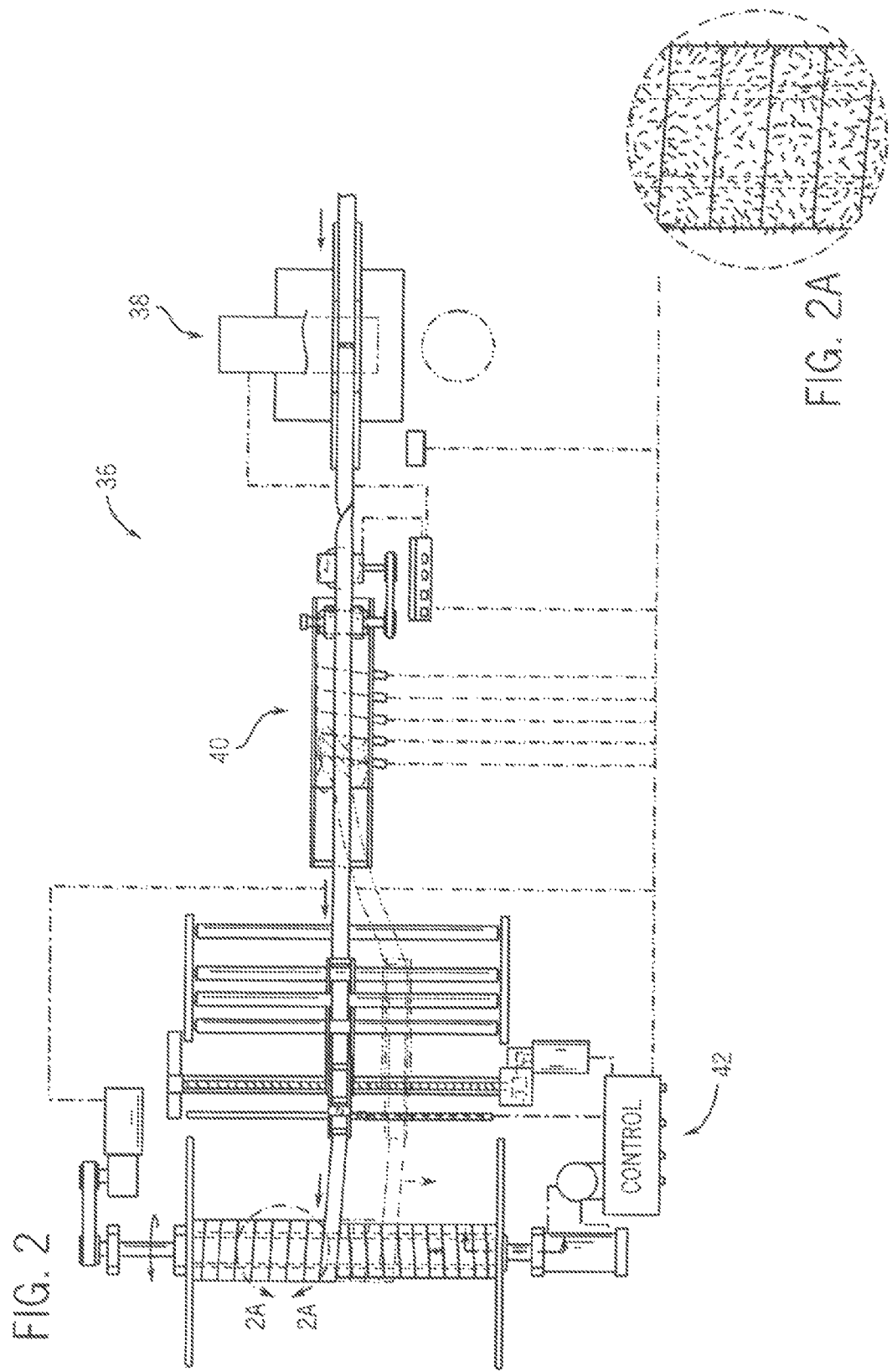

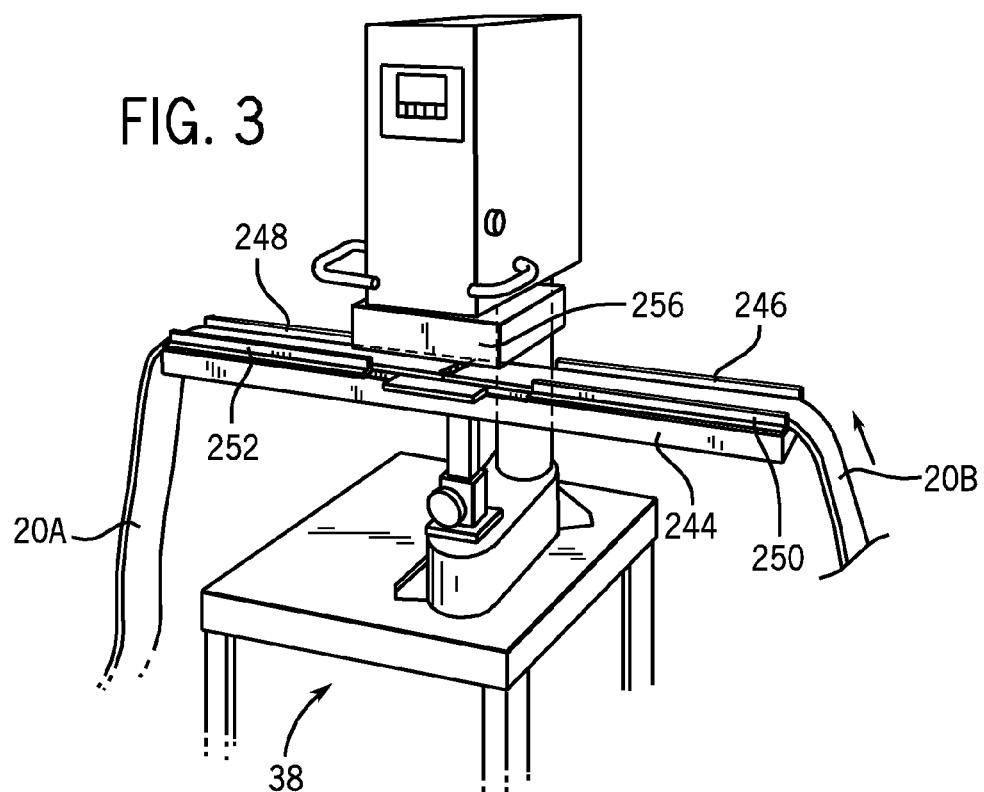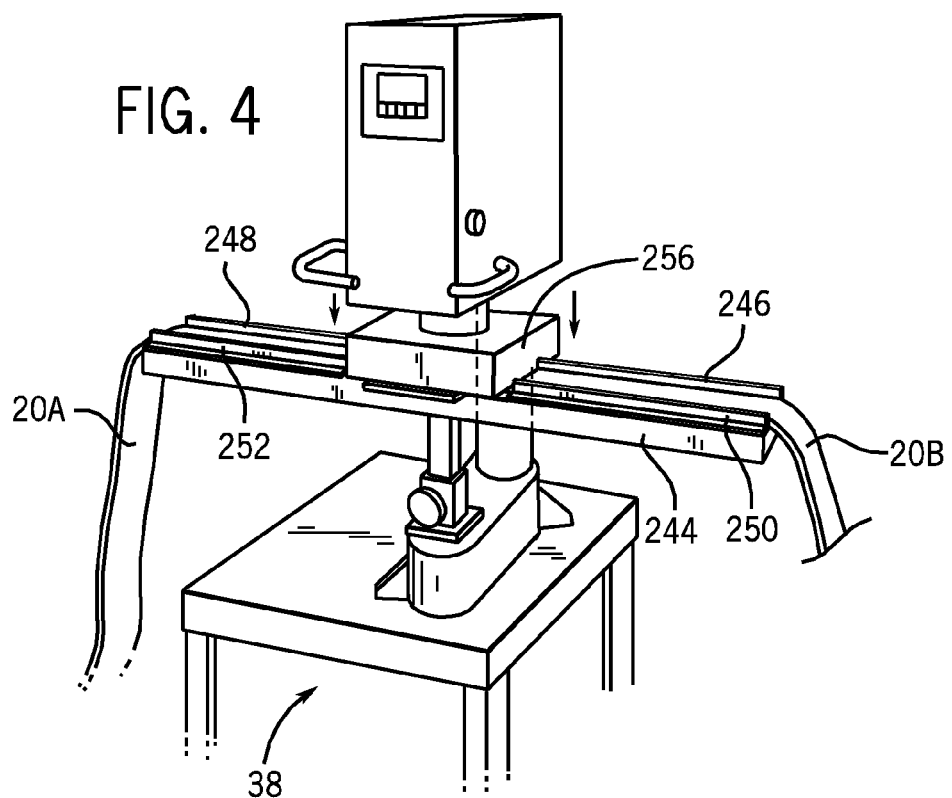

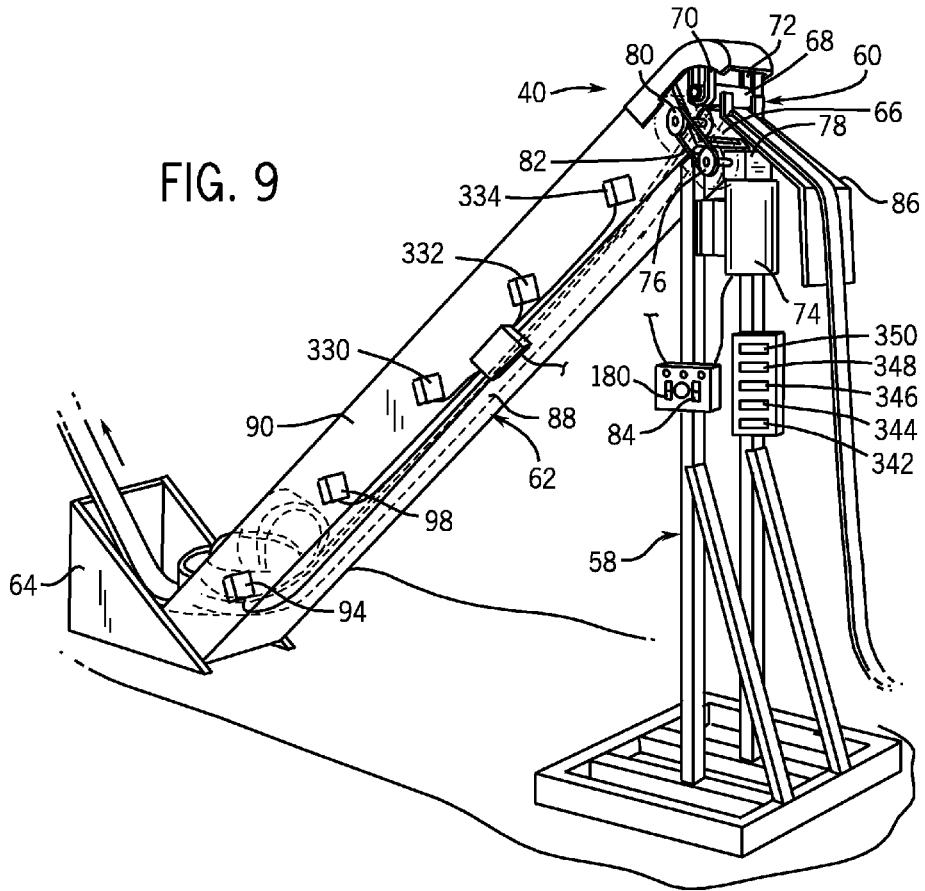
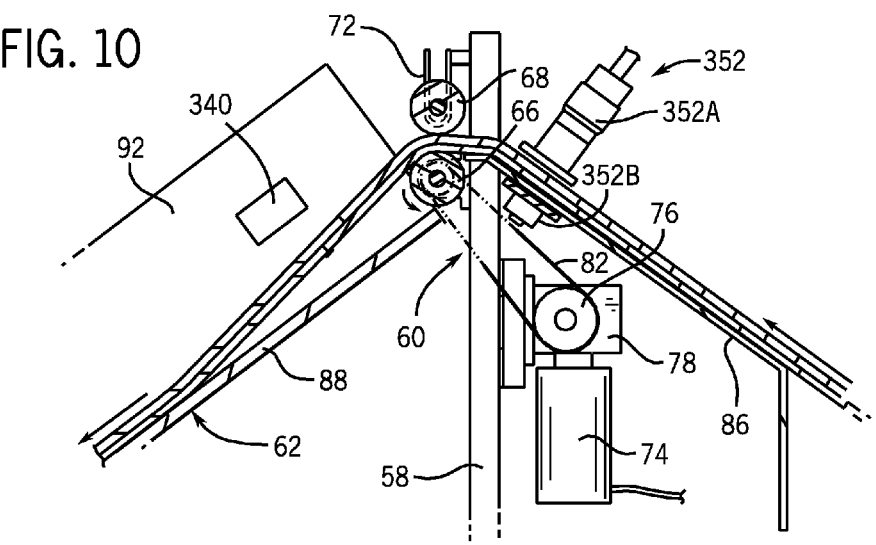

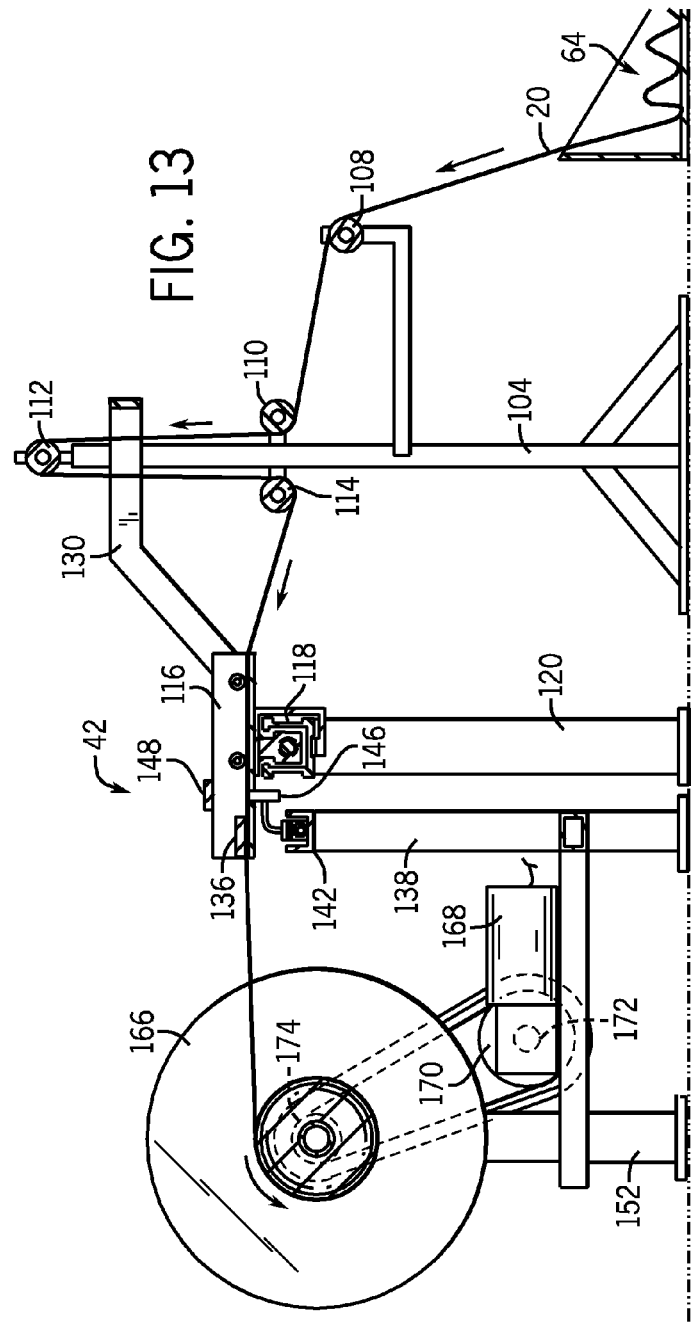
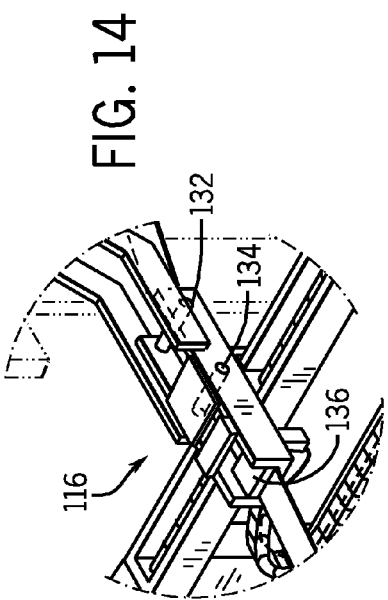
FIG. 13
FIG. 14

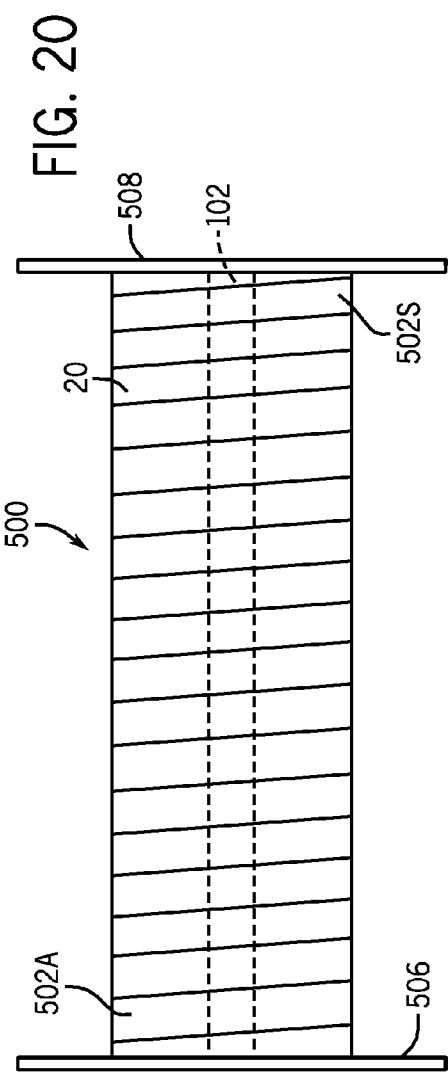
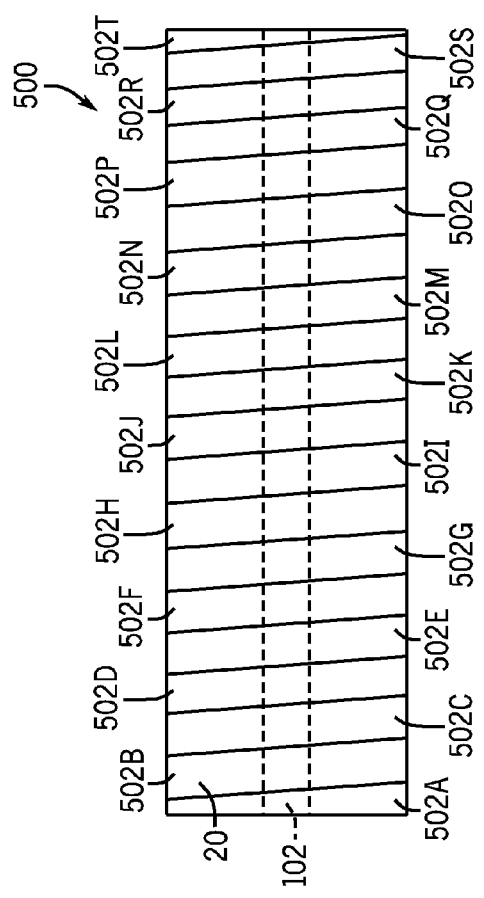

SYSTEM AND METHOD FOR PRODUCING A SPOOL OF TUBULAR FABRIC FOR USE IN MANUFACTURING PAINT ROLLER COVERS

IDENTIFICATION OF RELATED APPLICATION

This patent application is a continuation-in-part of U.S. patent application Ser. No. 11/203,833, filed on Aug. 15, 2005, entitled "Continuous Fabric Strip for Use in Manufacturing Paint Roller Covers," which is in turn a continuation-in-part of U.S. patent application Ser. No. 10/426,577, filed on Apr. 30, 2003, now U.S. Pat. No. 6,929,203, issued Aug. 16, 2005, entitled "Continuous Fabric Strip for Use in Manufacturing Paint Roller Covers," which is in turn a continuation-in-part of U.S. patent application Ser. No. 10/283,853 filed on Oct. 30, 2002, now U.S. Pat. No. 6,685,121, issued Feb. 3, 2004, entitled "System and Method for Producing a Continuous Fabric Strip for Use in Manufacturing Paint Roller Covers," which is in turn a continuation of U.S. patent application Ser. No. 09/864,969, filed on May 24, 2001, now U.S. Pat. No. 6,502,779, issued Jan. 7, 2003, entitled "System and Method for Producing a Continuous Fabric Strip for Use in Manufacturing Paint Roller Covers," all three of which are assigned to the assignee of the present patent application, and all three of which are incorporated herein by reference. This application is also related to U.S. patent application Ser. No. 10/426,541, filed on Apr. 30, 2003, now U.S. Pat. No. 6,902,131, issued Jun. 7, 2005, entitled "System and Method for Producing a Continuous Fabric Strip for Use in Manufacturing Paint Roller Covers," and to U.S. patent application Ser. No. 10/770,161, filed on Feb. 2, 2004, now U.S. Pat. No. 6,918,552, issued Jul. 19, 2005, entitled "System and Method for Producing a Continuous Fabric Strip for Use in Manufacturing Paint Roller Covers," both of which are hereby incorporated herein by reference. This patent application is also a continuation-in-part of U.S. patent application Ser. No. 11/871,307, filed Oct. 12, 2007 now U.S. Pat. No. 7,503,190, entitled, "Forming a Tubular Knit Fabric for a Paint Roller Cover," the entire teachings and disclosure of which are incorporated herein by reference thereto.

BACKGROUND OF THE INVENTION

Field of the Invention

The present invention relates generally to extended length tubular knit fabric for use in the manufacture of paint roller covers, and more particularly to a system and method for producing a roll having an extended length of tubular knit fabric wound thereupon, the tubular fabric being spirally wound upon a core with consecutive windings of the tubular fabric being located close adjacent each other, and with consecutive rows of the tubular fabric overlaying each other on the core.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the tubular fabric being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, or from a blend of natural and synthetic fibers. The knitting is typically performed on a circular sliver knitting machine, which produces a tubular knitted backing or base material with a knit-in pile in tubular segments which are approximately fifty-eight inches (1473 millimeters) in circumference by thirty to fifty yards (27.43 meters to 45.728 meters) long (depending on fabric weight).

Following the manufacture of the tubular knitted pile segments on a circular sliver knitting machine, the tubular knitted pile segments are slit longitudinally to produce extended knitted pile segments of fabric which are typically fifty-eight inches (1473 millimeters) wide by thirty to fifty yards (27.43 meters to 45.728 meters) long. These extended knitted pile segments of fabric are then tensioned longitudinally and transversely, stretched to a sixty inch (1524 millimeter) width or greater to guarantee the proper number of two and seven-eighth inch (73 millimeter) strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch (73 millimeter) wide knitted pile fabric strips, of which there are typically twenty for a sixty inch (1524 millimeter) wide fabric segment. During this slitting operation, the strips may be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. No. 6,502,779, U.S. Pat. No. 6,685,121, U.S. Pat. No. 6,902,131, U.S. Pat. No. 6,918,552, and U.S. Pat. No. 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch (1524 millimeter) wide fabric segment 20 into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the tubular knit fabric segment 20 helically wound around the core. During the manufacture of paint roller covers, the knitted pile fabric strips are secured to the core either by using adhesive or epoxy, or by thermally bonding the tubular knit fabric segment 20 in place on a thermoplastic core. For examples of these manufacturing processes see U.S. Pat. No. 4,692,975, to Garcia (the "'975 Patent"), U.S. Pat. No. 5,572,790, to Sekar (the "'790 Patent"), and U.S. Pat. No. 6,159,320, to Tams et al. (the "'320 Patent"), each of which are hereby incorporated by reference.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, the use of helically wound strips of fabric to provide the pile on roller covers is undesirable because, even where great care is taken in precisely cutting and winding the strips of fabric onto the core, the resulting juncture between two adjacent strips still sometimes results in noticeable marks being left on the surface being painted or otherwise coated by the roller cover. Even where the resulting juncture is initially carefully made, the pile fibers along the sides of the juncture are sometimes lost during use of the roller cover, as a result of the fabric being cut into strips. The precise cutting and winding operations required to produce a roller cover giving satisfactory performance can substantially increase the cost of manufacturing a roller cover.

The use of helically wound coverings on prior rollers has been necessary primarily due to the fact that the pile fabrics suitable for use as roller coverings could only be knitted in a tubular form having large diameters, which as recited above can range from twenty-four to fifty-eight inches for example, having a circumference far larger than the outer periphery of the core of a typical roller. These large diameter knitted fabrics were then slit to form a flat sheet of fabric having a pile extending from one surface thereof. The large sheet of fabric was then cut into strips for winding about the core to form the completed roller.

In a commonly assigned U.S. patent application bearing Ser. No. 11/740,119, titled "Tubular Sliver Knit Fabric For Paint Roller Covers," the disclosure and teachings of which are incorporated herein in their entireties by reference, the inventor of the present invention discloses a tubular sliver knit fabric for a roller cover having the pile extending from the outer surface of the knitted fabric and an inner diameter defined by the base fabric which is small enough in diameter to be slipped over the core of a roller, thereby eliminating the operations of cutting and helically winding strips of fabric onto a core as was required for fabrication of prior roller covers.

It is therefore desirable to provide tubular fabric for use in the manufacture of paint roller covers that is packaged in a compact and easily transportable form, and ready to be installed on to a paint roller core or otherwise be formed into a paint roller cover without further processing of the tubular fabric, without requiring any revision to an existing paint roller manufacturing processes or a substantial investment in new equipment.

The apparatus used by the system and method of the present invention to manufacture the rolls or spools of tubular fabric must also be of construction which is both durable and long lasting, and it should also require little or no maintenance to be provided by the user throughout its operating lifetime. In order to maximize the market appeal of the rolls or spools of tubular fabric of the present invention, the system of the present invention used to manufacture them and its cost of operation must both be as inexpensive as possible to thereby afford the rolls or spools of tubular fabric of the present invention the broadest possible market. Finally, it is also an objective that all of the aforesaid advantages and objectives of the rolls or spools of tubular fabric of the present invention be achieved without incurring any substantial relative disadvantage.

SUMMARY OF THE INVENTION

The disadvantages and limitations of the background art discussed above are overcome by the present invention. With this invention, tubular knitted fabric, typically used in the manufacture of paint roller covers, is provided in an extended length from any one of a number of knitting machines and/or processes. The knitted tubular fabric is provided to an accumulating station, where a length of the tubular fabric is gathered or accumulated, in order to be wound onto rolls or spools. The tubular fabric for use in the system and methods of the present invention can be produced by any means, and can be provided to the system in either pile side out or pile side in form, depending on the method of manufacture thereof.

The tubular fabric follows a generally linear path from the knitting manufacturing machine to an accumulating station to a winding station where the extended length knitted tubular fabric is compressed or flattened and wound onto a core which is typically a hollow cylindrical cardboard or plastic take-up core. The tubular fabric is wound to produce a spool of tubular fabric in which the tubular fabric is spirally wound on the cylindrical take-up core with consecutive windings of the tubular fabric being located close adjacent each other, and with consecutive rows of the tubular fabric overlaying each other on the cylindrical take-up core.

More particularly, an extended length of tubular fabric is supplied to the accumulator station, including a slide and/or a bin positioned at the end of the knitting machine or station. Located at a location near the bottom of the slide is a first photodetector, and located higher up the slide is a second photodetector.

As the motorized roller drive brings the extended length knitted pile tubular fabric into the accumulator, the accumulator bin at the bottom of the slide will fill up first, following which the extended length knitted pile tubular fabric will begin to accumulate on the slide itself, from the bottom upward. Until the extended length knitted pile tubular fabric begins to accumulate in the slide, both the first and the second photodetector are unobstructed. As the slide begins to fill up after the accumulator bin is full, first the first photodetector and then the second photodetector will be obstructed. The photodetectors are used to operate the winder station.

The extended length knitted pile tubular fabric travels from the accumulator station to the winder station, where it first passes over a series of rollers and then onto a guide arm which feeds the extended length knitted pile onto the cylindrical take-up core onto which it is wound. Another photodetector is located on the guide arm to detect whether or not the extended length knitted pile tubular fabric is present thereupon. The winder station has large circular discs located at each end of the cylindrical take-up core.

The lateral movement of the guide arm is controlled by a first servo drive, thus controlling the position on the cylindrical take-up core onto which the extended length knitted pile tubular fabric is wound. The rotation of the cylindrical take-up core is controlled by a second servo drive. By controlling the first and second servo drives, the winding of the extended length knitted pile tubular fabric onto the cylindrical take-up core can be precisely controlled to produce a tight winding in which the extended length knitted pile tubular fabric is spirally wound onto the cylindrical take-up core with consecutive windings of the extended length knitted pile tubular fabric being located close adjacent each other, and with consecutive rows of the extended length knitted pile tubular fabric overlaying each other on the cylindrical take-up core.

Thus, by operating the winder station with a computer-controlled operating system, the movement of the first and second servo drives can be coordinated to produce the desired winding operation, taking into account the physical parameters of the extended length knitted pile tubular fabric. Thus, the width and thickness of the extended length knitted pile tubular fabric will determine the relative operation of the first and second servos. In addition, as progressive layers of the extended length knitted pile tubular fabric are wound onto the cylindrical take-up core, the relative movements of the first and second servos will also have to be varied.

The overall speed of the winding operation is controlled by the three photodetectors. As long as both the first and second photodetectors in the accumulator are obstructed by the accumulated extended length knitted pile tubular fabric, the winding operation will operate at high speed. When only the first photodetector is obstructed, the winding operation will occur at a lower speed. Whenever the photodetector on the winding station is not obstructed, the winding operation will immediately stop.

Following the completion of the winding operation onto a cylindrical take-up core, an apparatus unrelated to the present invention would be used to secure the extended length knitted pile tubular fabric strip roll. One end of the apparatus supporting the cylindrical take-up core will then be retracted, allowing the extended length knitted pile tubular fabric strip roll to be removed from the winder station. The extended length knitted pile tubular fabric strip roll may then be packaged for delivery in a box or in plastic film, and shipped to a paint roller manufacturer.

It may therefore be seen that the present invention teaches both a system and a method for the manufacture of knitted pile tubular fabric of an extended length for use by paint roller cover manufacturers in their manufacture of paint roller covers. The extended length knitted pile tubular fabric of the present invention is supplied in an easy to use configuration which the paint roller cover manufacturers will find to be convenient in their manufacture of paint roller covers, without requiring any revision of their manufacturing processes or a substantial investment in new equipment.

The apparatus used by the system and method of the present invention to manufacture the extended length knitted pile tubular fabric strips is of a construction which is both durable and long lasting, and which will require little or no maintenance to be provided by the user throughout its operating lifetime. The system of the present invention used to manufacture the extended length knitted pile fabric strips and its cost of operation are relatively inexpensive, thereby affording the extended length knitted pile fabric strips of the present invention the broadest possible market and maximizing their market appeal. Finally, all of the aforesaid advantages and objectives of the extended length knitted pile fabric strips of the present invention are achieved without incurring any substantial relative disadvantage.

DESCRIPTION OF THE DRAWINGS

These and other advantages of the present invention are best understood with reference to the drawings, in which:

FIG. 2 is a top plan view of the preferred embodiment of a system for manufacturing the rolls of extended length tubular fabric of the present invention, showing the path of the tubular fabric from the seaming station, to a fabric accumulator, to a tensioning station and then to a winder station;

FIG. 2A is a detailed view at 2A-2A in FIG. 2 of the pile-side out tubular fabric;

FIG. 3 is a partial isometric view of the seaming station, showing abutting tubular fabric segments;

FIG. 4 is a partial isometric view of the seaming station illustrated in FIG. 3, showing abutting tubular fabric segments being heated;

FIG. 9 is an isometric view of the accumulator station showing a motorized roller drive for drawing the extended length tubular fabric into the accumulator station, a slide having accumulation detectors located thereon, and an accumulation bin at the bottom of the slide;

FIG. 10 is a side plan view of a portion of the accumulator station illustrated in FIG. 9 showing the motorized roller drive, the top of the slide and also showing a vacuum system;

FIG. 13 is a side plan view of the lower portion of the accumulator station, the tensioning station and the winder station illustrated in FIG. 2;

FIG. 14 is an enlarged view of a portion of the winder station showing one example of a tubular fabric guide carriage used to ensure the tubular fabric is compressed prior to winding;

FIG. 19 is a plan view of a roll of tubular knit fabric wound onto a flangeless core; and FIG. 20 is a plan view of a roll of tubular knit fabric wound onto a flanged core.

DETAILED DESCRIPTION OF THE PREFERRED EMBODIMENT

The system and methods of the present invention can be used with a tubular paint roller fabric that may be either a tubular knit base that is made of yarn having sliver pile fibers extending therefrom, a tubular knit base that is made of yarn having cut pile yarn segments extending therefrom or a tubular knit base that is made of yarn having a combination of sliver pile fibers and cut pile yarn segments extending therefrom. One example of the former tubular paint roller fabric is discussed in detail in the above-incorporated by reference U.S. patent application Ser. No. 11/740,119, and the latter tubular paint roller fabric is discussed in detail in the above-incorporated by reference U.S. patent application Ser. No. 12/116,022.

Figure 1A:
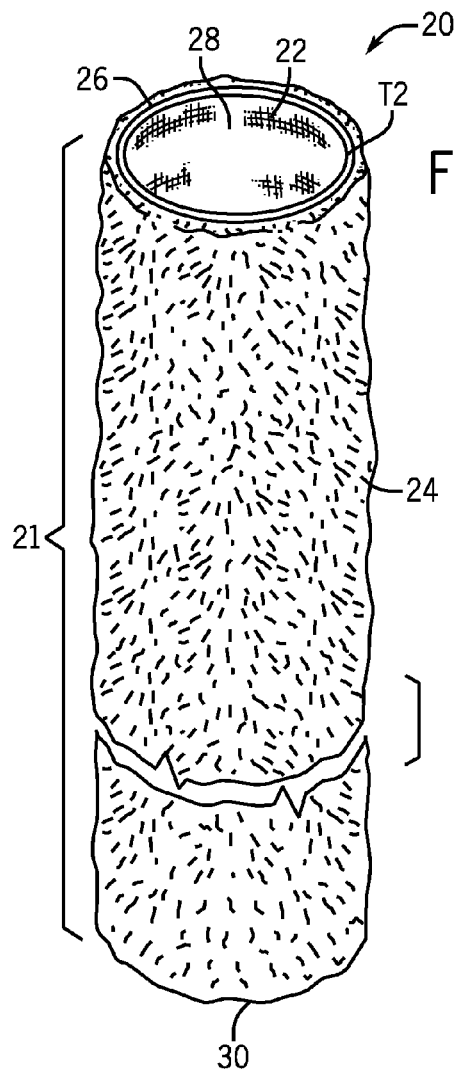
FIG. 1A is a perspective view of an extended length segment of tubular paint roller fabric, shown pile side out.
Figure 1C:
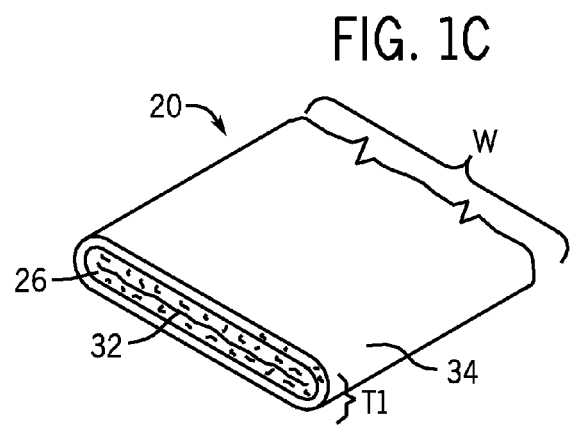
FIG. 1C is a perspective view of a pile side in, extended length tubular fabric segment, shown in a flattened or compressed state.
Figure 1B:
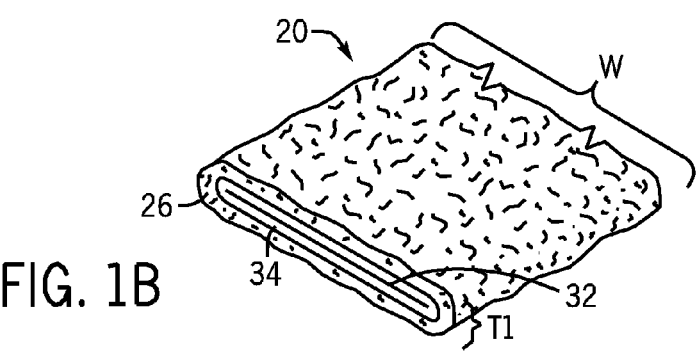
FIG. 1B is a perspective view of the extended length tubular fabric illustrated in FIG. 1A, shown in a flattened or compressed state.

It will be appreciated that the tubular knit fabric for use in the system and methods of the present invention can be manufactured by any method known to those skilled in the art, and is not limited to any particular knitting machine or process, or any backing or pile material of construction. The system and methods of the present invention preferably utilize an extended length tubular knit fabric formed in a pile side out manner, as illustrated in FIGS. 1A and 1B. However, consistent with the broader aspects of the present invention, the system and methods provided herein can be used with tubular knit fabric formed in a pile side in manner, as illustrated in FIG. 1C.

Referring first to FIG. 1A, a tubular knit fabric segment 20 that may be continuously knitted in an extended length 21 is shown. The extended length tubular knit fabric segment 20 consists of a knit backing or base material 22 having pile fibers 24 extending from the knit base material 22 on the outer surface of the extended length tubular knit fabric 20. It may be seen from a top edge 26 of the knit base material 22 that the extended length tubular knit fabric segment 20 has an essentially circular cross section, with the extended length tubular knit fabric segment 20 having a diametral opening 28 sized to accommodate a paint roller core member (not shown). The extended length tubular knit fabric segment 20 may be knitted to any length 21 as desired, depending on the type of knitting machine, a particular end use application of the fabric, the amount of fabric segment 20 that is to be sold and/or shipped a particular paint roller manufacturer, etc. The extended length tubular knit fabric segment 20 has a bottom end or edge, indicated generally at 30.

FIG. 1B illustrates the tubular knit segment 30 shown in a flattened or compressed state, such that internal surfaces 30 and 32 substantially touch or abut each other, and so that the diametral opening 28 is temporarily closed along the length 21 of the tubular knit segment 20. In this way, the extended length tubular knit fabric segment 20 may be wound into compact rolls or spools, as described in more detail below.

Turning now to FIGS. 2 through 20, the system of the present invention will be described. As recited above, the extended length tubular knit fabric segment 20 is manufactured by any method known to those skilled in the art and can be provided to the system of the present invention directly as it comes off of the manufacturing line, or it can be stored in a temporary storage container.

As illustrated in FIG. 2, an exemplary tubular fabric winding system 36 of the present invention includes, in its simplest form, a seaming station 38, an accumulator station 40, and a winding station, indicated generally at 42. It will be appreciated that although exemplary seaming and accumulator stations are illustrated and described, any type of seamer device and/or accumulator or storage device known to those skilled in the art that incorporates a means for determining the amount/length of extended length tubular knit fabric 20 present in the system 36 before the winding station and/or incorporates a means for determining the amount of tension on the extended length tubular knit fabric 20, can be used with good effect.

Referring now particularly to FIGS. 3-8, the seaming operation is illustrated in some detail. The ends of two segments of tubular knitted pile fabric 20A and 20B are brought together in abutting fashion on a table 244 which is a part of the seaming station 38. As shown in FIGS. 3 and 4, the sides of the table 244 have guide segments 246 and 248 located at the rear edge of the table 244 at the right and left sides, respectively, and guide segments 250 and 252 located at the front edge of the table 244 at the right and left sides, respectively. The guide segments 246, 248, 250, and 252 are used to precisely align the tubular knitted fabric 20A and 20B as they are attached together.

Figure 5:
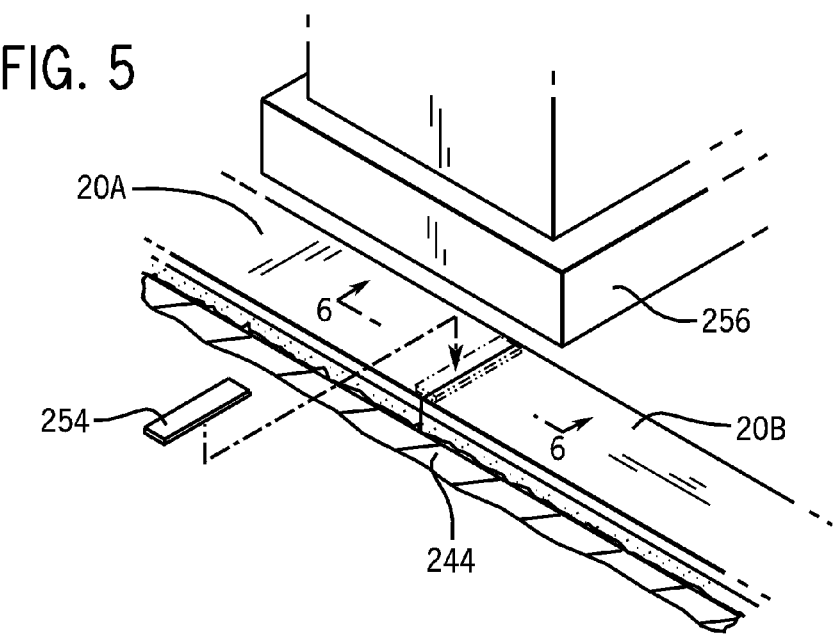
FIG. 5 is a close-up partial view of a portion of the seaming station illustrated in FIG. 3, showing the placement of a strip of heat-activated seaming tape on the seam between the contiguous ends of two consecutive tubular fabric segments forming a part of an extended length tubular fabric.
Figure 6:
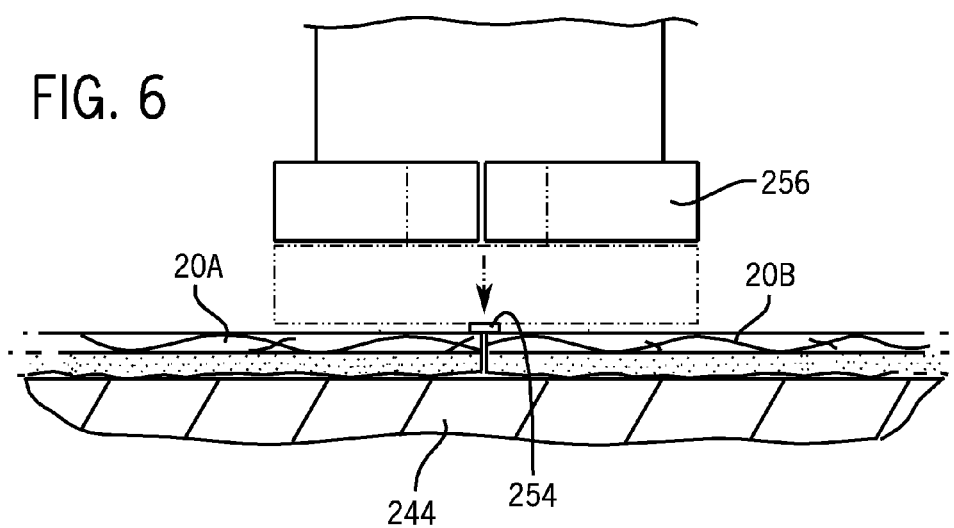
FIG. 6 is a side partial cross-sectional view similar to that illustrated in FIG. 5, showing the placement of the strip of heat-activated seaming tape on the seam between the contiguous ends of two consecutive tubular fabric segments forming a part of an extended length tubular fabric.

A strip of heat-activated seaming tape 254 is placed on the abutting ends of the knitted tubular fabric segments 20A and 20B as best shown in FIGS. 5 and 6. It will be noted that the length of the strip of heat-activated seaming tape 254 is approximately the same as the width of the tubular fabric segments 20 (although it could be slightly shorter as well). An example of a material which may be used for the strip of heat-activated seaming tape 254 is Unimark Tape, which is a woven cloth thermal seaming tape manufactured by Unitherm, Inc. of Cincinnati, Ohio.

The strip of heat-activated seaming tape 254 is placed in position at the abutting ends of the tubular fabric segments 20A and 20B. The seaming operation is performed by pressing the strip of heat-activated seaming tape 254 and the adjacent ends of the tubular fabric segments between a high temperature head 256 on the seaming station 38 and the table 244 of the seaming station 38 as shown in FIGS. 5 and 6. It will be noted from FIGS. 3 and 4 that the high temperature head 256 will fit between the ends of the guide segments 246 and 248 at the rear of the table 244 and between the guide segments 250 and 252 at the front of the table 244. In the preferred embodiment, it has been found that an optimal seaming operation is performed with the high temperature head 256 at approximately 400 degrees Fahrenheit for approximately three seconds. A bonding press which may be utilized by the seaming station 38 is the Model 907 Digital Automatic Flat Head Press, manufactured by Insta Graphic Systems, of Cerritos, Calif.

Figure 7:
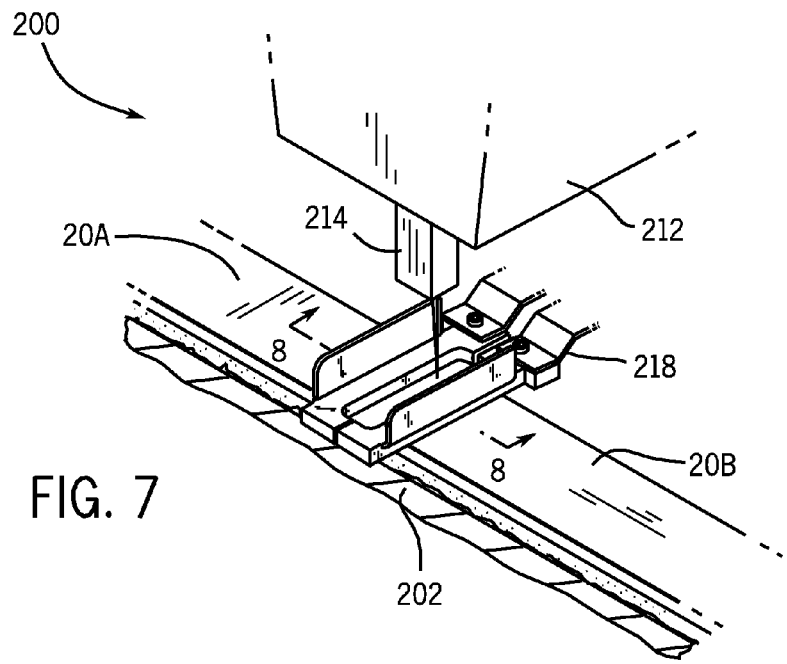
FIG. 7 is a close-up partial view of a portion of an alternate seaming station, showing a sewing head with a needle assembly positioned over the abutting adjacent ends of two consecutive tubular fabric segments forming a part of an extended length tubular fabric.
Figure 8:
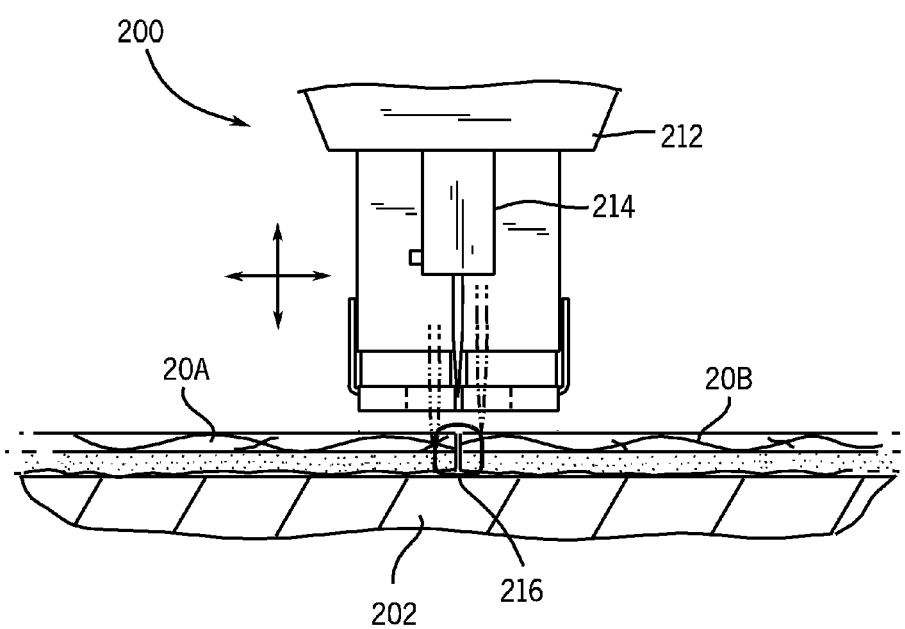
FIG. 8 is a side partial cross-sectional view of the portion of the seaming station illustrated in FIG. 7, showing the needle assembly lowered into position with a clamp foot of the needle assembly securing the contiguous ends of two consecutive tubular fabric segments forming a part of an extended length tubular fabric.

Referring next to FIGS. 7 and 8, an alternate seaming station 200 including a sewing head 212 is illustrated. The abutting ends of the tubular fabric segments 20A and 20B are positioned under the sewing head 212 which includes a needle assembly 214. The needle assembly 214 includes thread 216 and a clamp foot 218 which prevents misalignment of the knitted or woven pile fabric strips during the seaming operation. It will be noted that the thread 216 may be constructed of any type of natural, synthetic, or blended thread known to those skilled in the art.

The seaming operation is performed by lowering the needle assembly 214 which secures the adjacent ends of the tubular fabric segments 20A and 20B in place between the clamp foot 218 on the sewing head 212 and the table 202 of the seaming station 200 as best shown in FIGS. 7 and 8. Industrial sewing machines (programmable electronic pattern sewers) which may be utilized by the seaming station 200 include the Model BAS-311F-0, the Model BAS-311F-L, or the model BAS-326F-0, all manufactured by Brother Industries, Ltd., of Nagoya, Japan, or the Model LK-980 Series, manufactured by Juki Corporation, of Tokyo, Japan.

Consistent with the broader aspects of the present invention, other embodiments of the system can include seaming stations that utilize adhesives, staples, rivets, sonic welding methods, or any other industrial seaming method known to those skilled in the art to join the abutting or overlapping ends of consecutive tubular fabric segments 20A and 20B which are seamed together.

As portions of the tubular fabric segments 20 pass through the seaming station 38, they are accumulated by the accumulator station 40, which is best shown in FIGS. 9-12. It will be further appreciated that since the extended length tubular knit fabric 20 can be produced in a variety of different lengths directly from the knitted machine, certain embodiments of the present invention may not include the seaming station 38.

Turning now to FIGS. 9 through 12, the accumulator station 40 is described. The major components of the accumulator station 40 are a stand 58, a roller drive system 60, a slide 62, and an accumulator bin 64. The roller drive system 60 is supported at the top of the stand 58. The slide 62 has one end thereof located near the top of the stand 58, and extends downwardly at an angle with its other end being located at the same level as the bottom of the stand 58. The details of the stand 58 are not significant, other than the fact that the stand 58 must function to support the roller drive system 60 and the one end of the slide 62 in fixed positions.

The details of the roller drive system 60 are best shown in FIGS. 9 and 10. A drive roller 66 is rotatably mounted in a fixed horizontal position at the top of the slide 62. A driven roller 68 is located in a horizontal position above the drive roller 66, with the extended length tubular knit fabric segment 20 passing between the drive roller 66 and the driven roller 68. The driven roller 68 may be mounted with its ends located in U-shaped channels 70 and 72 as shown, or in any other suitable manner. The U-shaped channels 70 and 72 allow the driven roller 68 to move up and down according to the thickness of the tubular knit fabric segment 20 passing between it and the drive roller 66. In the preferred embodiment, the drive roller 66 and the driven roller 68 are made of rubber, with the driven roller 68 having sufficient weight to maintain pressure exerted by it against the extended length tubular knit fabric segment 20 and the drive roller 66.

It will be appreciated that the drive roller 66 and the driven roller 68 act to compress or flatten the extended length tubular knit fabric segment 20 as it passes between them so that it is substantially flat as illustrated in FIGS. 1B and 1C.

The roller drive system 60 is operated by an electric motor 74, which drives a drive pulley 76 through a gear reduction system 78. The electric motor 74 and the gear reduction system 78 are mounted in the stand 58 below the top thereof. The drive pulley 76 drives a driven pulley 80 mounted on one end of the drive roller 66 with a belt 82.

The operation of the electric motor 74 is controlled by an accumulator control switch 84, which may be mounted on the side of the stand 58. Preferably, the accumulator control switch 84 is a single pole, single throw "on-off" switch which the operator turns on and off to control the operation of the electric motor 74. A guide member 86, which functions to guide the extended length tubular knit fabric segment 20 to a location between the drive roller 66 and the driven roller 68, is located near the top of the stand 58.

The slide 62 is mounted onto the stand 58 with its upper end just below the drive roller 66, so that the extended length tubular knit fabric segment 20 will be directed onto the surface of the slide 62 as it is drawn into the accumulator station 40 by the roller drive system 60. The slide 62 has a bottom surface 88 and upwardly extending side walls 90 and 92, which together form a U-shaped configuration which will guide the extended length tubular knit fabric segment 20 down the slide 62. Located at the bottom of the slide 62 is the accumulator bin 64, which functions to store an accumulated portion of the length of the extended length tubular knit fabric segment 20.

Five photodetectors are located in the slide 62, with a first photodetector being located a short distance above the bottom of the slide 62, a second photodetector being located nearly half way up the slide 62, a third photodetector being located just over half way up the slide 62, a fourth photodetector being located further up the slide 62, and a fifth photodetector being located just below the drive roller 66. Each of these five photodetectors consists of a light source and a light detector, with one of these elements for each photodetector being mounted in the slide side wall 90 and the other element of that photodetector being mounted in the slide side wall 92. The photodetectors are mounted approximately halfway up each of the slide side walls 90 and 92.

Thus, the photodetectors consist of light sources 94, 98, 330, 332, and 334 mounted in the slide side wall 90 and light detectors 96, 100, 336, 338, and 340 mounted in the slide side wall 92 directly opposite to each of the light sources 94, 98, 330, 332 and 334, respectively. The light sources 94, 98, 330, 332, and 334 are oriented to direct light onto the light detectors 96, 100, 336, 338, and 340, respectively. The light detectors 96, 100, 336, 338, and 340 are oriented to detect light directed onto them from the light sources 94, 98, 330, 332, and 334, respectively.

Note that the first and second photodetectors are located sufficiently high in the slide 62 so that they will not be obstructed by the extended length tubular knit fabric segment 20 unless and until it begins to accumulate in the slide 62 itself. Due to the pitch of the slide 62, the extended length tubular knit fabric segment 20 will not begin to accumulate in the slide 62 until the accumulator bin 64 is full, at which time the extended length tubular knit fabric segment 20 will begin to accumulate in the slide 62, from the bottom upwards.

Figure 11:
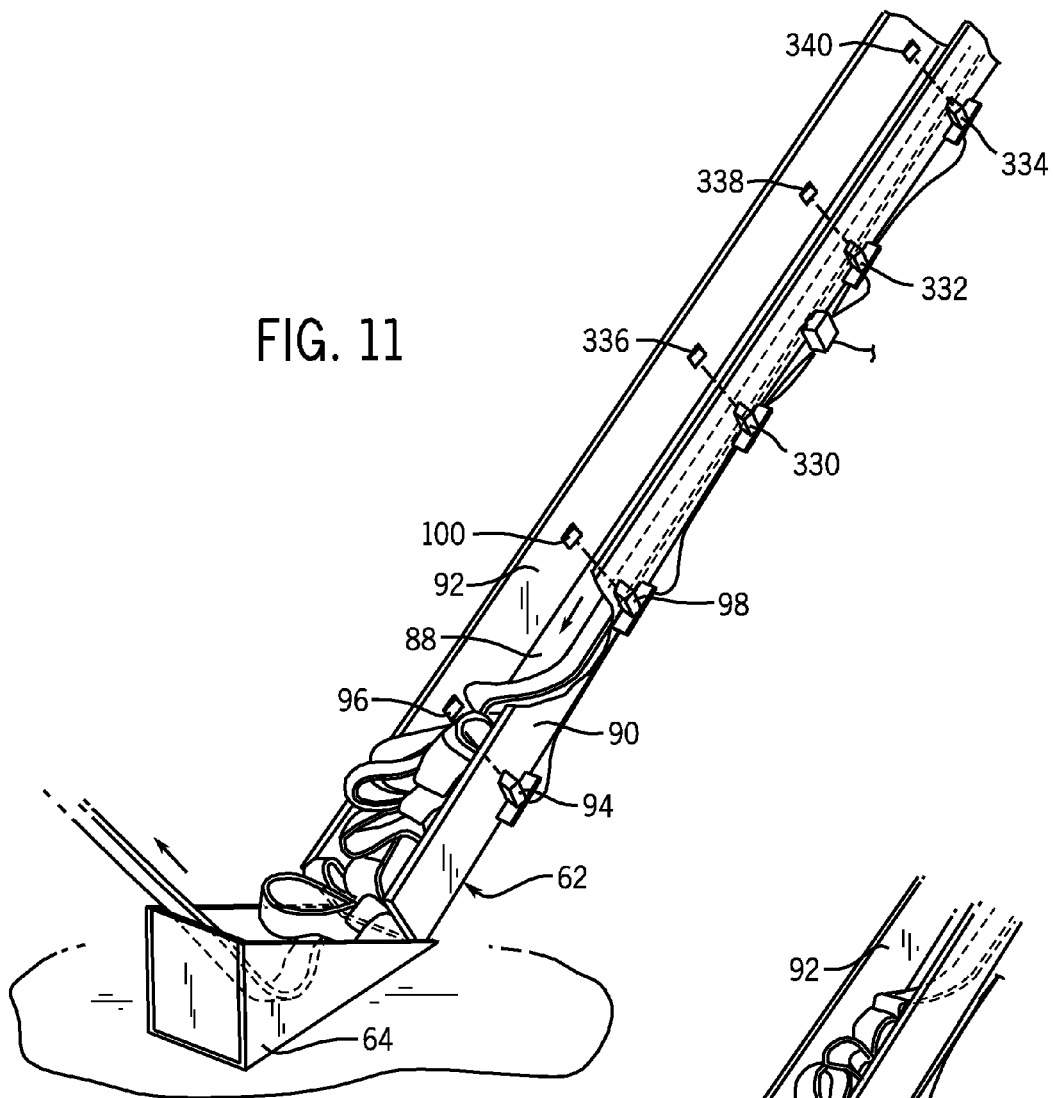
FIG. 11 is an isometric view of the accumulator station illustrated in FIG. 9 showing the lower portion of the slide and the accumulation bin at the bottom of the slide, and also showing two photodetector transmitters and receivers located in the slide at two locations, with portions of the accumulated extended length tubular fabric shown as obstructing the lower photodetector in the slide.
Figure 12:
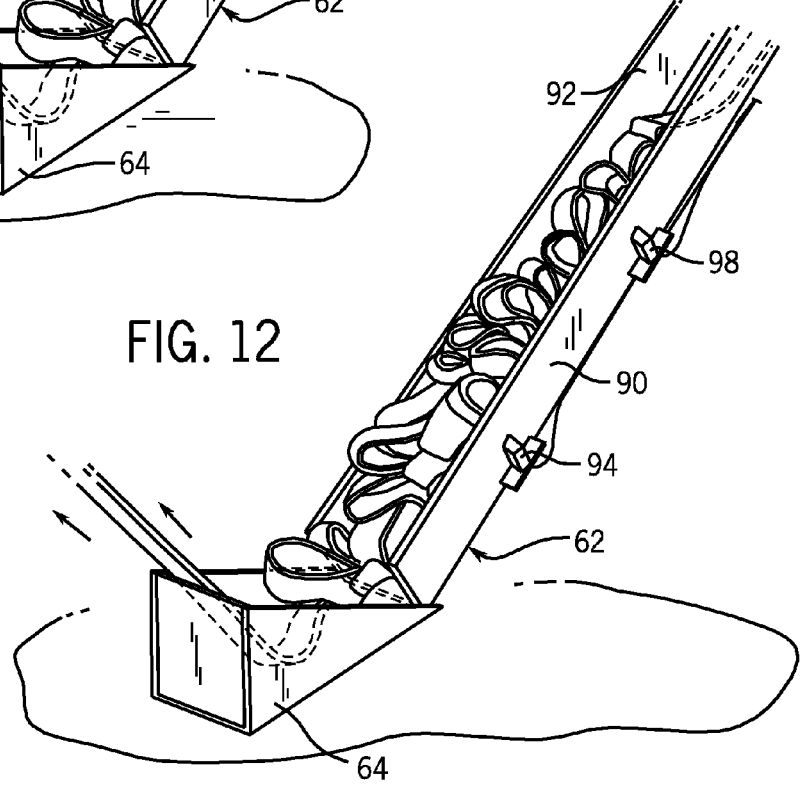
FIG. 12 is an isometric view similar to that illustrated in FIG. 11, but with portions of the accumulated extended length tubular fabric shown as obstructing both the lower and upper photodetectors in the slide.

Thus, as the extended length tubular knit fabric segment 20 is accumulated in the accumulator station 40, the accumulator bin 64 will fill up first. As the extended length tubular knit fabric segment 20 continues to accumulate, it will accumulate up to the first photodetector, blocking light emitted from the light source 94 from reaching the light detector 96, as shown in FIG. 11. As even more of the extended length tubular knit fabric segment 20 accumulates, it will accumulate up to the second photodetector, blocking light emitted from the light source 98 from reaching the light detector 100, as shown in FIG. 12.

Likewise, as more of the extended length tubular knit fabric segment 20 accumulates, it will accumulate up to the third photodetector, blocking light emitted from the light source 330 from reaching the light detector 336. As the extended length tubular knit fabric segment 20 accumulates even further, it will accumulate up to the fourth and then the fifth photodetectors, blocking light emitted from the light sources 332 and 334 from reaching the light detectors 338 and 340.

The purpose of the five photodetectors is thus to detect how much of the extended length tubular knit fabric segment 20 is located in the accumulator station 40. The system 36 and methods of the present invention uses information from the first and second photodetectors to control the operation of the winding station 42, by varying the speed at which the winding station 42 operates according to how much of the extended length tubular knit fabric segment 20 is located in the accumulator station 40 and thus is available to the winding station 42. This will be described in greater detail below, in conjunction with a description of the operation of the system and method of the present invention.

As illustrated in FIG. 9, status indicating lights 342, 344, 346, 348, and 350 are located on the side of the stand 58. The status indicating lights 342, 344, 346, 348, and 350 receive information from the five photodetectors and illuminate to indicate to an operator the amount of extended length knitted pile tubular fabric within the accumulator station 40. For example, when the extended length tubular knit fabric segment 20 accumulates to block the first photodetector, a first status indicating light 342 is illuminated. When the extended length tubular knit fabric segment 20 accumulates up to the second photodetector, a second status indicating light 344 is illuminated. Likewise, as the extended length tubular knit fabric segment 20 accumulates up to the third photodetector, a third status indicating light 346 is illuminated. Finally, as the extended length tubular knit fabric segment 20 accumulates up to the fourth photodetector and then the fifth photodetector, a fourth status indicating light 348 and then a fifth status indicating light 350 is illuminated.

Referring to FIG. 10 for the moment, a vacuum system 352 is located on the accumulator station 40 near the roller drive system 60. The vacuum system 352 can include first and second vacuum components 352A and 352B to remove any loose fibers, lint or other particulate from the pile sides of the extended length tubular knit fabric segment 20 before it enters the accumulator station 40. Although included in the preferred embodiment, the vacuum system 352 is an optional feature of the present invention.

Referring next to FIGS. 13 through 18, the winding station 42 is illustrated in detail. The function of the winding station 42 is to wind the extended length tubular knit fabric segment 20 onto a cylindrical take-up core 102 (shown in FIGS. 17 and 18), particularly in a highly efficient and compact fashion. The winding station 42 thus performs three functions which are all directed toward winding the extended length tubular knit fabric segment 20 onto the take-up core in the desired manner. The first function is a pre-tensioning of the extended length knitted pile fabric strip, the second function is controlling the lateral position at which the extended length tubular knit fabric segment 20 is wound onto the take-up core, and the third function is controlling the rotation of the take-up core as the extended length tubular knit fabric segment is wound onto it.

Figure 15:
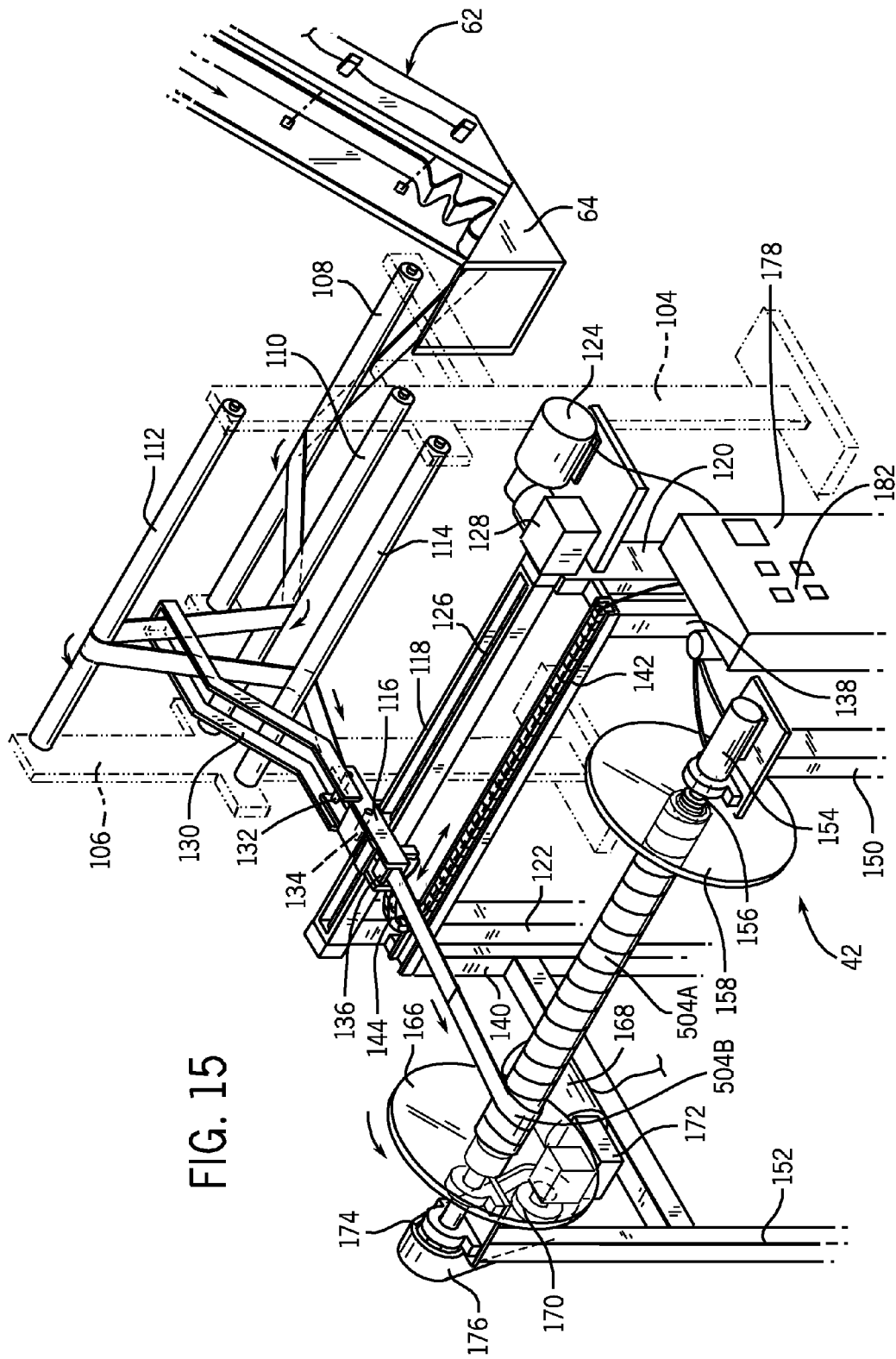
FIG. 15 is an isometric view of the accumulator station and the winder station illustrated in FIG. 13, showing the extended length tubular knit fabric segment being wound onto a cylindrical take-up core mounted between two discs.

The pretensioning function is performed by four rollers which are all mounted parallel to each other. Referring particularly to FIGS. 13 and 15, first and second roller support structures 104 and 106 are used to support four rollers 108, 110, 112, and 114. The first and second roller support structures 104 and 106 are located on the side of the winding station 42 facing the accumulator station 40.

The rollers 110 and 114 are spaced apart and are located on opposite sides of the first and second roller support structures 104 and 106, approximately sixty percent of the height of the first and second roller support structures 104 and 106. The roller 110 is located on the side of the first and second roller support structures 104 and 106 facing the accumulator station 40, and the roller 114 is located on the opposite side of the first and second roller support structures 104 and 106. The roller 108 is mounted so that it is spaced away from the first and second roller support structures 104 and 106, and is located slightly lower than the level of the rollers 110 and 114. The roller 112 is centrally located at the top of the first and second roller support structures 104 and 106.

The path of the extended length tubular fabric segment 20 leads from the accumulator bin 64 in the accumulator station 40 onto the top of the roller 108, and then under the roller 110, over the top of the roller 112, and under the roller 114. From the roller 114, the extended length tubular fabric segment 20 enters the mechanism which controls the lateral position at which the extended length tubular fabric segment 20 is wound onto the take-up core. It will thus be appreciated by those skilled in the art that the four rollers 108, 110, 112, and 114 perform a pre-tensioning of the extended length tubular knit fabric segment 20 at it passes therethrough.

Figure 17:
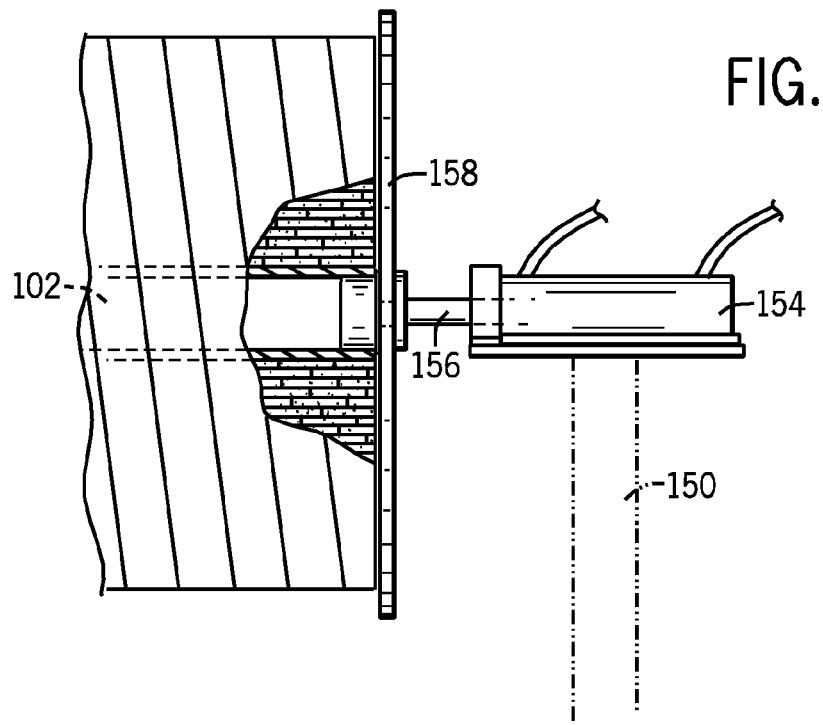
FIG. 17 is a plan view of a portion of a full cylindrical take-up core and how it is engaged by one of the discs and the support apparatus.
Figure 18:
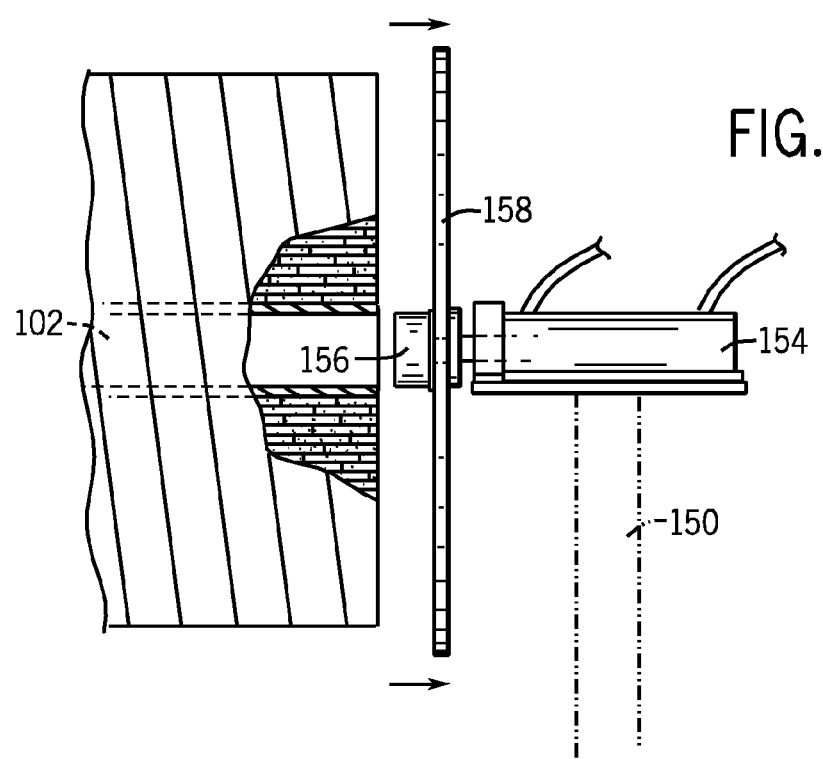
FIG. 18 is a plan view similar to that illustrated in FIG. 17, but with the disc and the support apparatus retracted to allow the full cylinder to be removed.

The next portion of the winding station 42 is the mechanism which controls the lateral position at which the extended length tubular knit fabric segment 20 is wound onto the take-up core 102 (FIGS. 17 and 18). This function is accomplished by providing a strip guide carriage 116 which is driven laterally on a track member 118 which is supported at the top of two track support members 120 and 122 in a position at approximately the same height as the roller 114. As illustrated in FIG. 14, it may be seen that the track member 118 is open on the top side thereof, thereby defining a U-shaped cross section, with a portion of the tubular fabric guide carriage 116 extending down into the interior of the U. The track member 118 is mounted in a position which is parallel to the four rollers 108, 110, 112, and 114.

As illustrated in FIG. 15, a servo motor 124 drives a drive screw 126 through a gear reduction system 128, with the servo motor 124 and the gear reduction system 128 being mounted on the track support member 120. The drive screw 126 extends through a portion of the strip guide carriage 116 to thereby drive it laterally back and forth on the track member 118 as the drive screw 126 rotates. The servo motor 124 is highly precise in its operation, and can be driven to precisely position the strip guide carriage 116 on the track member 118, and may provide a feedback signal to indicate where the strip guide carriage 116 is on the track member 118 at any given time.

Mounted onto and extending from the strip guide carriage 116 is an irregular guide member 130 which extends around the portions of the extended length tubular knit fabric segment 20 which extend between the roller 110 and the roller 112, and between the roller 112 and the roller 114. When viewed from above, the irregular guide member 130 will appear to have a highly extended U-shape. When viewed from the side, it may be seen that the irregular guide member 130 extends upwardly as it moves away from the strip guide carriage 116 toward the extended length tubular knit fabric segment 20 which it guides, guiding them at a location nearer the roller 112 than the rollers 110 and 114.

It may also be seen that the width of the irregular guide member 130 is such that it accommodates the width of the extended length tubular knit fabric segment 20 therein. As the irregular guide member 130 is moved laterally with movement of the strip guide carriage 116 on the track member 118, the irregular guide member 130 will tend to guide the extended length tubular knit fabric segment 20 to move laterally on the rollers 108, 110, 112, and 114. Looking more closely at the strip guide carriage 116 itself, it may be seen that it has an internal width which closely accommodates and guides the extended length tubular knit fabric segment 20 therein. The upper surface of the strip guide carriage 116 presents a U-shaped configuration with the extended length tubular knit fabric segment 20 being accommodated within the U.

Located in the strip guide carriage 116 and extending between its lateral sides at locations spaced away from the bottom of the U are two guide rollers 132 and 134 and a flattening plate or bracket 136. From the detailed view of FIG. 14, it may be seen that the extended length tubular knit fabric segment 20 passes under the guide rollers 132 and 134, and underneath the flattening plate 136 on the bottom of the U formed in the top of the strip guide carriage 116. The flattening plate 136 serves to compress or flatten the tubular knit fabric segment 20 just before it is wound on to the take-up core 102. The flattening plate 136 can be configured to move or float to accommodate variations in the width W of the tubular knit fabric segment 20, while still providing a compression function.

As the strip guide carriage 116 moves laterally on the track member 118, it will serve to control the lateral position at which the extended length tubular knit fabric segment 20 is wound onto the take-up core 102 (FIGS. 17 and 18). The strip carriage guide 116 may optionally include a vacuum system (not shown) configured to vacuum all sides of the compressed extended length tubular knit fabric segment 20 before it is wound on to the take-up core 102.

As illustrated in FIG. 15, located on the side of the track support members 120 and 122 opposite the accumulator station 40 are two channel support members 138 and 140 which support a U-shaped channel 142 which is located slightly lower than the track member 118. The U-shaped channel 142 is mounted parallel to the track member 118 with its open side facing upwardly. Located in the U-shaped channel 142 is a flexible wiring guide 144 which has one end fastened to the strip guide carriage 116. The flexible wiring guide 144 carries wiring to the strip guide carriage 116 for use with a sixth photodetector carried by the strip guide carriage 116.

The sixth photodetector consists of a light source 146 and a light detector 148 both mounted onto the strip guide carriage 116, as shown in FIG. 13. The light source 146 is mounted in the bottom of the strip guide carriage 116 and the light detector 148 is mounted in the top of the strip guide carriage 116. The light source 146 is oriented to direct light onto the light detector 148, and the light detector 148 is oriented to detect light directed onto it from the light source 146. It may be seen that the sixth photodetector will function to detect the presence or absence of the extended length tubular knit fabric segment 20 in the strip guide carriage 116.

As illustrated in FIG. 15, the next portion of the winding station 42 is the mechanism which controls the rotation of the take-up core 102 as the extended length tubular knit fabric segment 20 is wound onto it. This function is accomplished by removably supporting the take-up core and rotating it to wind the extended length tubular knit fabric segment 20 thereupon. Located at the end of the winding station 42 opposite the accumulator station 40 are two winder support members 150 and 152 which are used to support the take-up core 102, the mechanism rotating it, and the mechanism releasably retaining it.

Figure 16:
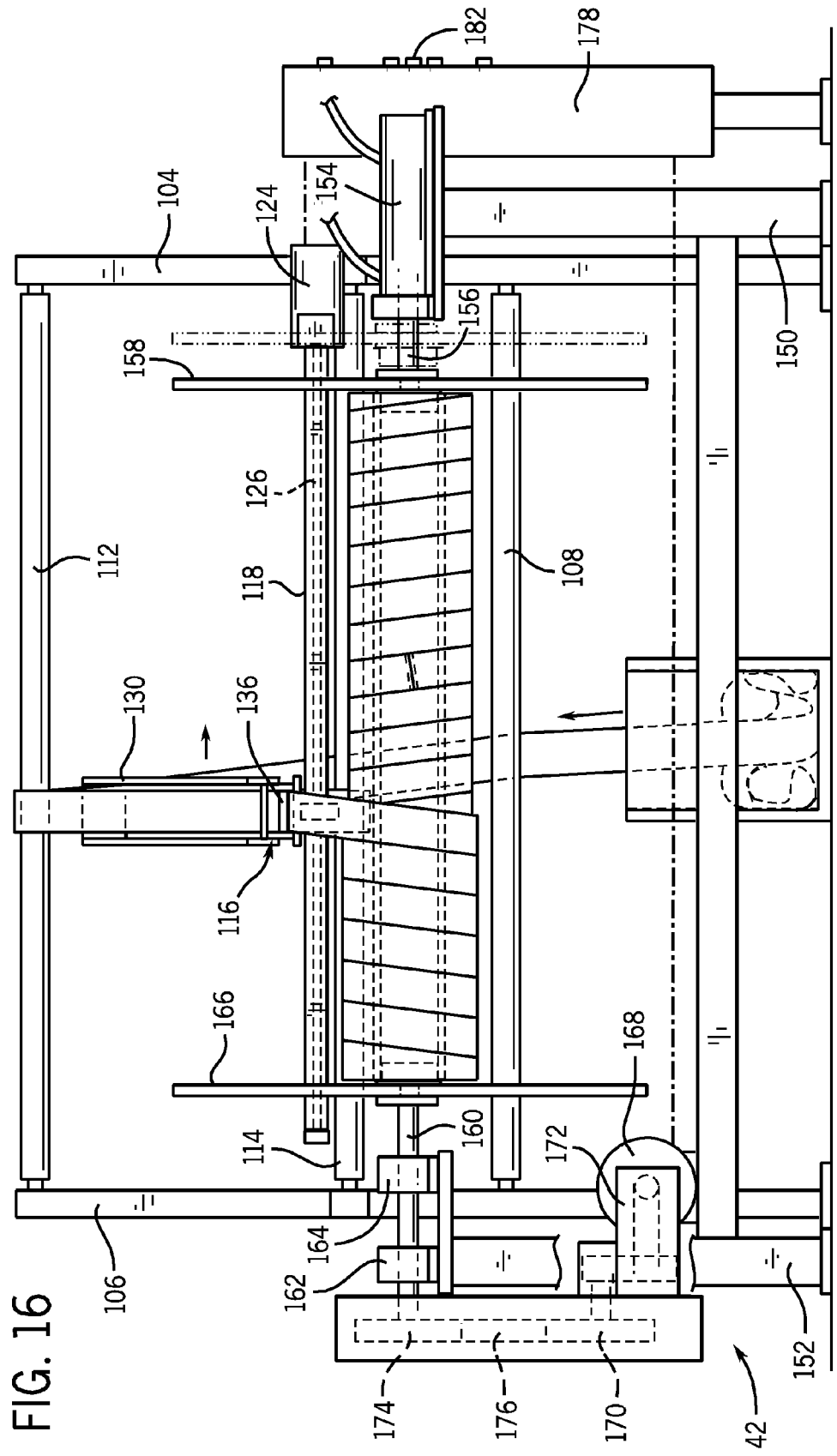
FIG. 16 is a front plan view of the winder station illustrated in FIGS. 13 and 15, showing how one of the discs and support apparatus retaining one side of the cylindrical take-up core can be retracted to remove the cylindrical take-up core from the winder station when the cylindrical take-up core is full.

As illustrated in FIGS. 15 and 16, located on top of the winder support member 150 is a hydraulic support member 154 having a rotatable core support member 156 extending therefrom. The distal end of the core support member 156 has an end disc 158 mounted thereupon at a location near the end thereof, and a distal portion which is configured and arranged to fit closely within an end of the take-up core 102 (as best shown in FIGS. 17 and 18). It may be seen that the core support member 156 may be extended (as shown in FIG. 17) to retain the take-up core 102 in position in the winding station 42 or retracted (as shown in FIG. 18) to allow a full take-up core 102 to be removed and an empty take-up core 102 to be installed.

The other end of the take-up core 102 is supported by a core support member 160 which is rotatably mounted on the winder support member 152 using bearing mounts 162 and 164. The distal end of the core support member 160 has an end disc 166 mounted thereupon at a location near the end thereof, and a distal portion (not shown) which is identical to that of the core support member 156 (shown in FIG. 18) and is configured and arranged to fit closely within an end of the take-up core 102.

The take-up core 102 is rotated by a servo motor 168, which drives a drive pulley 170 through a gear reduction system 172. The servo motor 168 and the gear reduction system 172 are mounted on the winder support member 152. The drive pulley 170 drives a driven pulley 174 mounted on an end of the core support member 160 with a belt 176. The servo motor 168 is highly precise in its operation, and can be driven to precisely rotate the take-up core 102, and may provide a feedback signal to indicate the rotational position of the take-up core 102 is at any given time since beginning to wind the extended length tubular knit fabric segment 20 on the take-up core 102.

As illustrated in FIGS. 15 and 16, completing the construction of the winding station 42 is a control system 178 which is mounted on the channel support member 138. The control system 178 is used to control the operation of the winding station 42, and has as inputs the photodetectors on the accumulator station 40, a winder control switch 180 (shown in FIG. 9 mounted near the accumulator control switch 84) which allows an operator to stop the winding process on the winding station 42, the sixth photodetector on the winding station 42, and winding process selection elements 182 which are located on the control system 178.

The operation of the winding station 42 to wind the extended length tubular knit fabric segment 20 onto the take-up core 102 may now be explained briefly in a manner which will at once be understood by those skilled in the art. By using the winding process selection elements 182 to enter into the control system 178 parameters such as the physical characteristics of the extended length tubular knit fabric segment 20 being wound, the control system 178 will properly control the winding process. The most important of these characteristics relates to the thickness T1 of the compressed extended length knitted pile fabric segment 20, as illustrated in FIG. 1B, since the width W is preferably a standard known value. Alternatively, the thickness T2 of the backing 22 and pile 24, as indicated in FIG. 1A may also be entered into the control system 178.

The winding process selection elements 182 can be set up to allow the selection of a particular weight or style of the extended length tubular knit fabric segment 20 being wound, to indicate the start of the winding of a new take-up core 102, or other parameters which will provide the same information (a style number or name, for example).

The other factor is where the winding is started (i.e., where the strip guide carriage 116 is when the winding process begins). It may be desirable to start with the strip guide carriage 116 guiding the extended length tubular knit fabric segment 20 onto the take-up core 102 at an end thereof, but the control system 178 can also operate even if the winding is started in the center of the take-up core 102. This is so because the winding process basically involves a mathematically-based control which is designed to ensure that the extended length tubular knit fabric segment 20 is substantially spirally wound onto the cylindrical take-up core 102 with consecutive windings of the extended length tubular knit fabric segment 20 being located close adjacent and/or abutting each other, and with consecutive rows of the extended length tubular knit fabric segment 20 overlaying each other on the cylindrical take-up core 102, as best illustrated in FIGS. 19 and 20.

Then, by using the control system 178 to automatically control the operation of the servo motor 124 and the servo motor 168, the winding operation can be precisely controlled. Since the control system 178 will always know where the winding process is, the servo motor 124 and the servo motor 168 can be operated to control the lateral position of the extended length tubular knit fabric segment 20 as it is wound onto the take-up core 102 to ensure that it is spirally wound with consecutive windings of the extended length tubular knit fabric segment 20 being located close adjacent each other and with consecutive rows of the extended length tubular knit fabric segment 20 overlaying each other, the spacing between rotations being mathematically determined based on the inputs supplied by the winding process selection elements 182.

The speed of the winding operation is affected by the inputs from the first and second photodetectors in the accumulator station 40. If the inputs from them indicate that both the first and second photodetectors are blocked (indicating the presence of the extended length tubular knit fabric segment 20 in the accumulator bin 64 and up the slide 62 to the level of the second photodetector), the winding operation will proceed at its fastest speed. If the inputs from the first and second photodetectors indicates that only the first photodetector is blocked (indicating the presence of the extended length tubular knit fabric segment 20 in the accumulator bin 64 and only at the lower portion of the slide 62), the winding operation will proceed at a medium speed.

If the inputs from the first and second photodetectors indicates that neither the first photodetector is blocked (indicating a diminished supply of the extended length tubular knit fabric segment 20 in the accumulator bin 64 only), the winding operation will proceed at a slow speed. The operator of the system can stop the winding operation by using the winder control switch 180 on the accumulator station 40 at any time (as best shown in FIG. 9). Thus, when the operator is going to take a break and will not be seaming additional segments of tubular fabric, the winding operation will be stopped. When the end of the extended length tubular knit fabric segment 20 is reached, the winding operation will proceed at the slow speed until the extended length tubular knit fabric segment 20 moves through the sixth photodetector; when the sixth photodetector is not blocked, the winding operation will be finished.

Turning now to FIG. 19, a roll or spool 500 of extended length tubular knit fabric 20 is shown. The roll 500 includes the extended length fabric tubular knit fabric segment 20 wound on to the take-up core 102. The extended length tubular knit fabric segment 20 is wound onto the take-up core 102 in a plurality of nonoverlapping consecutive windings 502A through 502S of the extended length tubular knit fabric segment 20. The consecutive windings 502A through 502S are precisely positioned to be touching each other or substantially abutting each other in each of the rows (indicated as 504A and 504B in FIG. 15) of consecutive windings that overlap each other on the take-up core.

In order to provide the most compact roll of extended length tubular knit fabric 20, the consecutive windings 502A through 502S are not spaced-apart from each other on the take-up core 102. More specifically, there are no significant gaps between adjacent consecutive windings 502A through 502S. Moreover, the consecutive windings 502A through 502S do not overlap each other on the take-up core 102, in order to ensure that the extended length tubular knit fabric segment 20 on the roll 500 is not distorted or otherwise wrinkled and thus made unsuitable for use in the manufacture of paint roller covers.

FIG. 20 is a roll 500 of extended length tubular knit fabric 20 configured in the same manner as illustrated in FIG. 19, however, the take-up core 102 of the roll shown in FIG. 20 includes end flanges 506 and 508.

It may therefore be appreciated that the system and method of the present invention can be used to provide rolls of extended length tubular knit fabric that are compact, easily transportable and including any length of extended length tubular knit fabric desired by the end user. The system and methods of the present invention and the rolls of extended length tubular knit fabric produced thereby facilitates either the manufacture of a paint roller cover of a desired finished length, or the manufacture of an extended length segment from which segments of any desired size can be cut for finishing as paint roller covers, thereby facilitating the mass manufacture of paint roller covers. The system and method of the present invention can use either tubular sliver knitted pile fabric, tubular knitted yarn cut pile fabric and/or a tubular fabric including a combination of sliver fibers and cut yarn pile, as well as a number of different backing materials.

The system of the present invention is of a construction which is both durable and long lasting, and yields a roll of tubular knit fabric that is convenient, compact and does not damage the delicate pile of tubular fabric. The roll or spool produced by the system and methods of the present invention also reduces the cost of manufacturing paint roller covers when compared to conventional methods of manufacturing paint roller covers, thereby affording it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A roll of extended length tubular fabric, comprising:
   an extended length tubular fabric, the extended length tubular fabric including a backing and pile fibers extending therefrom, the extended length tubular fabric having first and second ends and a substantially circular cross section with a diametral opening extending from the first end to the second end, wherein the extended length tubular fabric is compressed to provide a flat configuration; and
   a take-up core member;
   wherein the compressed extended length tubular fabric is wound onto the take-up core member in a plurality of consecutive windings of the extended length tubular fabric that are located close adjacent to each other and which form a plurality of consecutive rows of the extended length tubular fabric overlaying each other on the take-up core member;
   wherein the tubular fabric is of sufficient length to be wound in a plurality of consecutive rows; and
   wherein the extended length tubular fabric is oriented in a pile-side out configuration.

2. A roll of extended length tubular fabric as defined in claim 1, wherein the take-up core member is made of either cardboard or thermoplastic material.

3. A roll of extended length tubular fabric as defined in claim 1, wherein the take-up core member is cylindrical and hollow.

4. A roll of extended length tubular fabric as defined in claim 1, wherein the take-up core member has a first end including a first end flange and a second end including a second end flange.

5. A roll of extended length tubular fabric as defined in claim 1, wherein the consecutive windings are substantially spirally wound onto the take-up core member.

6. A roll of extended length tubular fabric as defined in claim 1, wherein the pile fibers of each adjacent consecutive winding of the extended length tubular fabric on the roll touch each other.

7. A roll of extended length tubular fabric as defined in claim 1, wherein the pile fibers of the extended length tubular fabric comprise at least one of sliver fiber and cut yarn.

8. A roll of extended length tubular pile fabric, comprising:
   an extended length tubular fabric of substantially circular cross section having an outer circumferential surface and an inner circumferential surface comprising first and second equally sized walls, the tubular fabric compressed such the first and second equally sized walls abut each other;
   a hollow take-up core member;
   wherein the extended length tubular fabric is substantially spirally wound onto the take-up core member with nonoverlapping consecutive windings of the extended length tubular fabric being located close adjacent to each other and with consecutive rows of the extended length tubular fabric overlaying each other on the take-up core member; and
   wherein the extended length tubular fabric comprises a backing and pile extending outwardly therefrom oriented in a pile-side out configuration.

9. A roll of extended length tubular fabric as defined in claim 8, wherein the pile of the extended length tubular fabric comprises at least one of cut yarn and sliver fibers.

10. A roll of extended length tubular fabric as defined in claim 8, wherein the take-up core member is made of either cardboard or thermoplastic material.

11. A roll of extended length tubular fabric as defined in claim 8, wherein the take-up core member is cylindrical and hollow.

12. A method for producing a roll of an extended length tubular fabric comprising:
    removably supporting a take-up core member for rotation at a controlled rate to thereby control rotational displacement of the take-up core member;
    supplying the extended length tubular fabric to be wound onto the take-up core member, the extended length tubular fabric including a backing and pile fibers extending therefrom, the extended length tubular fabric oriented in a pile-side out orientation;
    controlling the lateral position at which the extended length tubular fabric is presented to the take-up core member to be wound thereupon and varying the lateral position with respect to the take-up core member; and
    winding the extended length tubular fabric onto the take-up core member to produce a roll of tubular fabric while simultaneously controlling both the rotational displacement of the take-up core member and the lateral position in which the extended length tubular fabric is presented to the take-up core member to thereby substantially spirally wind the extended length tubular fabric onto the take-up core member with consecutive windings of the extended length tubular fabric being located close adjacent each other, and with consecutive rows of the extended length tubular fabric overlaying each other on the take-up core member.

13. The method of claim 12, further comprising forming the extended length tubular fabric by seaming at least two shorter segments of tubular fabric together in a seaming station.

* * * * *

UNITED STATES PATENT AND TRADEMARK OFFICE
CERTIFICATE OF CORRECTION

PATENT NO. : 8,157,197 B2
APPLICATION NO. : 12/268548
DATED : April 17, 2012
INVENTOR(S) : Dale C. Jelinek, Marcus L. Skildum and Daniel L. Sinykin Page 1 of 1

It is certified that error appears in the above-identified patent and that said Letters Patent is hereby corrected as shown below:

Title Page, Item (73) Assignee:

"Siny Corp., Janesville, WI (US)" should read --Siny Corp. DBA Monterey Mills, Janesville, WI (US)--.

Signed and Sealed this
Fifteenth Day of May, 2012

David J. Kappos
*Director of the United States Patent and Trademark Office*